July 20, 1965    E. H. B. BARTELINK    3,195,342
FRICTION MEASURING APPARATUS
Original Filed Feb. 8, 1955
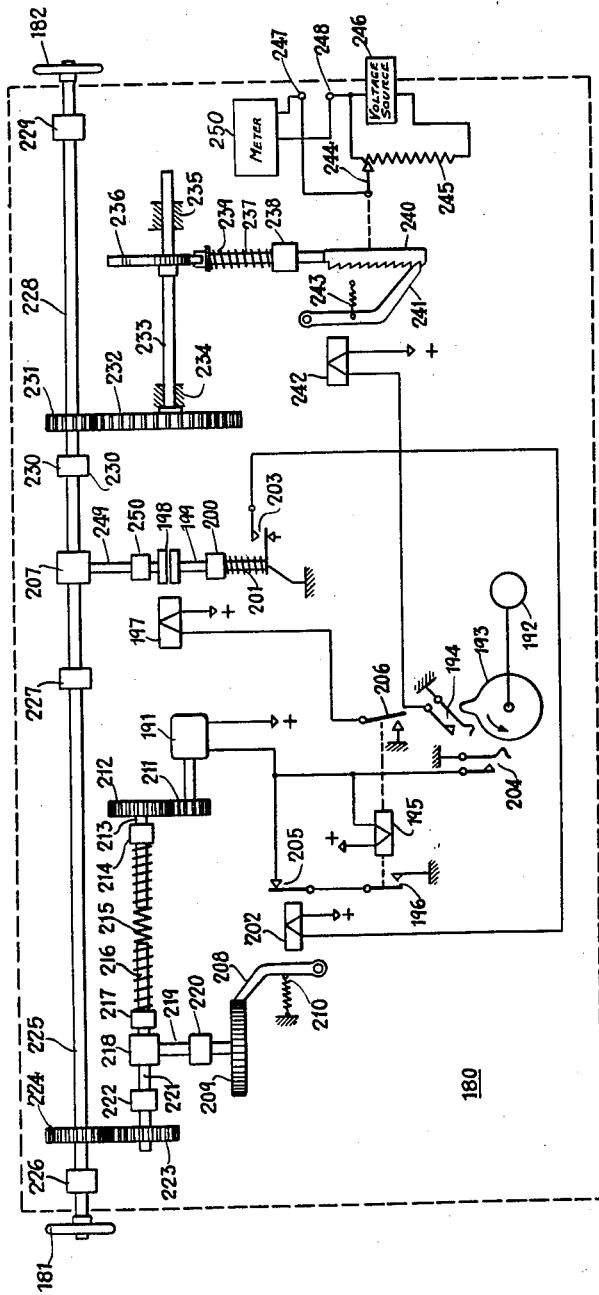
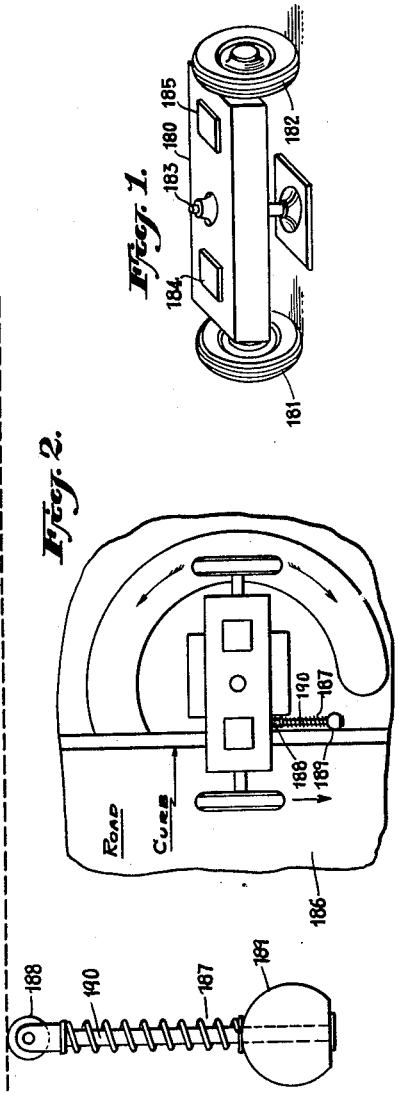
INVENTOR.
EVERHARD H.B. BARTELINK.
BY
ATTORNEYS.

United States Patent Office 3,195,342
Patented July 20, 1965

3,195,342
FRICTION MEASURING APPARATUS
Everhard H. B. Bartelink, P.O. Box 425, Concord, N.H.
Original application Feb. 8, 1955, Ser. No. 486,873, now Patent No. 2,999,999, dated Sept. 12, 1961. Divided and this application Aug. 11, 1961, Ser. No. 130,799
6 Claims. (Cl. 73—9)

This invention relates to friction measuring apparatus and particularly to apparatus for measuring the friction between a wheel and a roadway.

In my copending application, Serial No. 486,873, filed February 8, 1955, and entitled "Highway Traffic Control System," now Patent No. 2,999,999, of which this application is a division, a traffic control system for regulating the speed of traffic on a highway in accordance with the variation of certain conditions on such highway is described. This application is directed to the apparatus shown in said copending application and used for measuring the friction between a wheel and the roadway to provide information to computing apparatus used in the traffic control system for determining the maximum safe speed.

One object of the invention is to provide apparatus which will measure the friction between the wheel and the roadway and which will control an electrical circuit in accordance with the magnitude of the coefficient of friction.

Another object of the invention is to provide simple apparatus which may be unattended and which will periodically measure the friction between a wheel and a roadway.

Other objects of the invention will be apparent from the following detailed description of the preferred embodiment thereof which description should be considered in conjunction with the accompanying drawings in which:

FIG. 1 is a perspective, schematic view of the preferred embodiment of the invention;

FIG. 2 is a plan view of the embodiment shown in FIG. 1 and illustrates the relationship of such embodiment to a roadway; and FIG. 3 is a combined mechanical and electrical diagram showing the components forming part of the embodiment illustrated in FIGS. 1 and 2.

The preferred embodiment of the invention for measuring or sensing the amount of friction between a wheel and a roadway, and hence the adhesion coefficient of the road surface, illustrated in the drawings, comprises a box-like structure or table 180 supported by two wheels 181 and 182, pivoted around shaft 183 and weighted by weights 184 and 185. As shown in plan view in FIG. 2, the table 180 may be rotated about the shaft 183 so that wheel 181, which is the driving wheel, rests on the roadway 186. When not in use the table 180 may be rotated so that the axis of the wheels 181 and 182 is parallel to the length of the roadway. By means of the driving wheel 181, this table 180 may be moved against the pressure of a spring 187 which holds a roller 188 against it and which at the other end is attached to a post or other rigid structure 189. This spring is guided by a shaft 190 and is able to move freely in an axial direction.

In order to determine the maximum adhesion, wheel 181 is driven against the increasing resistance of spring 187 until slip occurs. The maximum pressure exerted against spring 187 is then measured and used as an indication of the adhesion factor. FIG. 3 shows one form of apparatus for making this measurement. This arrangement contains a device to detect the occurrence of slipping and further means to immediately disconnect the mechanical transmission between the driving motor 191 and the driven wheel 181 when slipping does occur. The device is operated at intervals determined by the timing motor 192 which drives a cam 193 in such a fashion as to make periodic measurements of the adhesion coefficient. At the beginning of such a measurement cycle, cam 193 first closes contacts 194, thereby restoring the mechanism to its starting position as will be described later. In the starting position motor relay 195 is released and its contacts 206 are open, thus breaking the circuit for the operating coil 197 for magnetic clutch 198. Coil 197, when de-energized, releases the clutch plates, and shaft 199, supported by bearing 200, will therefore return to its "normal" position under the influence of spring 201, thus opening the circuit for the differential release magnet 202 at contacts 203. Subsequently cam 193 closes contacts 204 and contacts 204 apply ground to motor 191 and to the motor relay 195. As the differential release magnet 202 is de-energized at this time, relay 195 when operated closes contacts 196 and thereby provides a holding circuit for relay 195 and for the motor circuit over contacts 205 and 196 until such time as relay 202 operates. Relay 195 when operated, closes contacts 206 thus energizing the coil 197, operating the magnetic clutch 198 and connecting shaft 199 to the differential 207. As relay 202 is released, its arm 208 engages the teeth of gear 209 under the influence of spring 210 and locks this gear. Motor 191 through a suitable gear reduction 211 and 212 drives shaft 213 supported by bearing 214. This shaft 213 is connected through spring 215 to another shaft 216, which is supported by bearing 217. Shaft 216 is on the same center line as shaft 213. Shaft 216 is connected to differential 218, and as the third shaft 219 of this differential (supported by bearing 220) is locked by the arm 208, shaft 216 drives shaft 221 (supported by bearing 222) directly through differential 218. Through a suitable gearing mechanism 223 and 224, the motor 191 drives shaft 225 (supported by bearings 226 and 227), and thus the driven wheel 181. As wheel 181 is being driven, it causes the table 180 to move against spring 187 which presses against table 180 through contact roller 188. The other end of the spring 187 is held by a post or other rigid device 189. A sliding shaft or similar device 190 is provided to give guidance to the motion of spring 187.

As the table 180 moves against the pressure of spring 187, the idler wheel 182 at the other side of the table 180 follows the motion of wheel 181 exactly. Idler wheel 182 is attached to shaft 228 which is supported by bearings 229 and 230 and which drives one input of differential 207. One other input of differential 207 is driven by shaft 225. Through a suitable gear reduction 231 and 232 shaft 228 also drives shaft 233 supported by bearings 234 and 235 and carrying cam 236. This cam 236 moves shaft 237 axially in bearing 238 against the pressure of spring 239. The force exerted by spring 239 is kept very small with respect to the force exerted by springs 215 and 187. The same is true for spring 201. As the idler wheel 182 moves, cam 236 drives shaft 237 and the attached ratchet 240. The arm 241 of relay 242 is normally pulled into the ratchet 240 by spring 243, thus preventing return of ratchet 240 to its starting position until magnet 242 has operated and disengaged arm 241. This does not occur until the table 180 has returned to its normal or starting position and, therefore, cam 236 has receded and spring 239 is able to return shaft 237 to its starting position. Shaft 237 is mechanically connected to slider 244 on potentiometer 245. Voltage is applied to the ends of potentiometer 245 by source 246 and the voltage between slider 244 and one end of potentiometer 245 is applied to terminals 247 and 248. As a result the voltage between terminals 247 and 248 is a direct measure of the maximum amount of displacement of table 180 and therefore of the maximum force that has been exerted by the driven wheel 181. The voltage may be indicated in any conventional manner, such as by a meter 250.

It is desired to immediately disconnect the driving force from the driven wheel 181 as soon as this wheel experiences any slipping at all. Referring again to differential 207, this differential is so connected to shafts 225 and 228 that shaft 249, supported by bearing 250, will be at rest so long as the rotations of shafts 225 and 228 are equal and opposite. This latter condition exists so long as no slip occurs in either wheel. As the load on wheel 182, which consists only of the mechanism required to drive ratchet 240, is negligible there will be no slippage of wheel 182; however, as soon as any slip occurs in wheel 181, shaft 249 will be turned, thereby turning shaft 199 through clutch 198 and closing contact 203. Contacts 203, when closed, operate the differential releasing magnet 202 thus freeing shaft 219 and instantaneously removing all torque in spring 215 and therefore the "drive" of wheel 181. Magnet 202 simultaneously opens contact 205, thereby interrupting the circuit for motor 191 and releasing the holding relay 195. In the absence of any driving torque on wheel 181, table 180 is returned to its original position by spring 187; however, the slider 244 on potentiometer 245 retains the position corresponding to the maximum forces exerted by wheel 181 before slippage occurred. When timing motor 192 has completed the rest of its cycle, cam 193 closes contacts 194, operating magnet 242 thereby releasing ratchet 241 which, together with slider 244, returns to the starting position.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

I claim:

1. Means for measuring the friction between a wheel and a supporting surface comprising a table mounted on a pair of wheels, means for driving one of said wheels and thereby moving said table away from a predetermined position, the other of said wheels being an idler wheel rotatable by frictional engagement with its supporting surface and movement of said table, means for energizing said driving means, means for retarding movement of said table in increasing amount with movement of said table away from said predetermined position, means connected to said wheels for comparing the relative speeds of rotation of said wheels, means controlled by said comparing means and connected to said energizing means for stopping said driving means when said one wheel slips with respect to its supporting surface and thereby has a different speed of rotation than said other wheel, and means connected to and driven by said driving means for providing a voltage which is related in magnitude to the amount of rotation of said wheels prior to the stopping of said driving means.

2. Means for measuring the friction between a wheel and a supporting surface comprising a table mounted on a pair of wheels, means for driving one of said wheels and thereby moving said table away from a predetermined position, the other of said wheels being an idler wheel rotatable by frictional engagement with its supporting surface and movement of said table, means for periodically energizing said driving means, means for retarding movement of said table in increasing amount with movement of said table away from said predetermined position, means for stopping said driving means when said one wheel slips with respect to its supporting surface, said stopping means including a differential having input shafts connected to said wheels and having an output shaft which moves with relative rotation between said input shafts and means operable by movement of said output shaft and connected to said means for energizing said driving means for de-energizing said driving means, whereby said energizing means is de-activated by said differential when the speed of rotation of said one wheel exceeds the speed of rotation of the other of said wheels, and means connected to and driven by said other wheel for providing a voltage which is related in magnitude to the amount of rotation of said other wheel during the energization of said driving means.

3. Means for sensing the friction between a wheel and a supporting surface comprising a table mounted on a pair of wheels, motor means, first means interconnecting said motor means and one of said wheels for driving said one wheel and thereby moving said table in a predetermined direction and away from a predetermined position, means for resisting movement of said table in said direction in increasing proportion to the amount of movement of said table from said predetermined position, an electrical circuit having a variable control for varying an electrical characteristic of said circuit, and driving means connecting said control and the other of said wheels for positioning said control in accordance with the amount of rotation of said other wheel.

4. Means for sensing the friction between a wheel and a supporting surface comprising a table mounted on a pair of wheels, motor means, first differential means interconnecting said motor means and one of said wheels for driving said one wheel and thereby moving said table in a predetermined direction and away from a predetermined position, means for resisting movement of said table in said direction in increasing proportion to the amount of movement of said table from said predetermined position, releasable locking means connected to said differential means for causing said motor means to drive said one wheel when said locking means is in locking position, second differential means interconnecting said wheels and having an output shaft which rotates when the speeds of rotation of said wheels differ, an electrical circuit having a variable control for varying an electrical characteristic of said circuit, driving means connecting said control and the other of said wheels for varying said control in accordance with the amount of rotation of said other wheel, and means connected to and operated by said output shaft for releasing said locking means upon rotation of said output shaft.

5. Means for sensing the friction between a wheel and a supporting surface comprising a table mounted on a pair of wheels, motor means, first differential means interconnecting said motor means and one of said wheels for driving said one wheel and thereby moving said table in a predetermined direction and away from a predetermined position, means for resisting movement of said table in said direction in increasing proportion to the amount of movement of said table from said predetermined position, releasable locking means connected to said differential means for causing said motor means to drive said one wheel when said locking means is in locking position, second differential means interconnecting said wheels and having an output shaft which rotates when the speeds of rotation of said wheels differ, an electrical circuit having a variable control for varying an electrical characteristic of said circuit, driving means connecting said control and the other of said wheels for varying said control in accordance with the amount of rotation of said other wheel, means connected to and operated by said output shaft for releasing said locking means upon rotation of said output shaft and means for periodically causing said motor means to drive said first differential means.

6. Means for sensing the friction between a wheel and a supporting surface comprising a table mounted on a pair of wheels, motor means, first differential means interconnecting said motor means and one of said wheels for driving said one wheel and thereby moving said table in a predetermined direction and away from a predetermined position, means for resisting movement of said table in said direction in increasing proportion to the amount of movement of said table from said predetermined position, releasable locking means connected to said differential means for causing said motor means to drive said one wheel when said locking means is in locking position, second differential means interconnecting said wheels and having an output shaft which rotates when the speed of rotation of said wheels differ, a potentiometer having an arm, driving means connecting said arm and the other of said wheels for positioning said arm in accordance with the amount of rotation of said other wheel, means connected to and operated by said output shaft for releasing said locking means upon rotation of said output shaft and means for periodically energizing said motor means.

References Cited by the Examiner

UNITED STATES PATENTS

| | | | |
|---|---|---|---|
| 2,290,618 | 7/42 | Bosomworth | 73—146 |
| 2,299,895 | 10/42 | Harrall et al. | 73—9 |
| 2,387,901 | 10/45 | Haverstick | 73—118 X |
| 2,496,405 | 2/50 | Foufounis | 73—9 |

RICHARD C. QUEISSER, *Primary Examiner.*

DAVID SCHONBERG, *Examiner.*